3,234,208
WATER-SOLUBLE MONOAZO DYESTUFFS AND PROCESS FOR THEIR MANUFACTURE
Hans Wilhelm Liechti, Oberwil, Basel-Land, Switzerland, assignor to Ciba Limited, Basel, Switzerland, a company of Switzerland
No Drawing. Filed Mar. 20, 1963, Ser. No. 266,521
Claims priority, application Switzerland, Mar. 23, 1962, 3,532/62; Feb. 20, 1963, 2,143/63
6 Claims. (Cl. 260—193)

The present invention provides valuable water soluble monoazo dyestuffs, free from sulphonic acid groups, of the general formula (1) 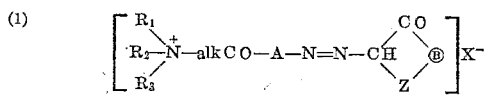

in which A represents a benzene radical, alk represents an alkylene group, especially a methylene or ethylene group, B represents an arylene radical, $R_1$, $R_2$ and $R_3$ represent alkyl, cycloalkyl or monocyclic aralkyl groups of $R_1$, $R_2$ and $R_3$ together with the nitrogen atom can form a heterocyclic ring, Z represents a —CO—, —$SO_2$— or —NH— group, and X represents an anion.

The invention also provides various processes for the manufacture of the new dyestuffs which are obtained when (a) the diazo compound of an amine of the formula (2) 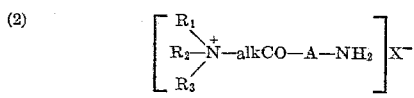

wherein $R_1$, $R_2$, $R_3$, alk and A have the meanings given above, is coupled with a compound of the formula (3) 

wherein B and Z have the meanings given above, the components being free from sulfonic acid groups, or (b) a dyestuff of the general formula (4) 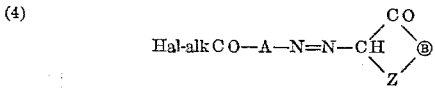

in which alk, A and B have the meanings given above and Hal represents a halogen atom, for example, a chlorine or a bromine atom, is reacted with a secondary or tertiary amine, or (c) a monoazo dyestuff of the general formula (5) 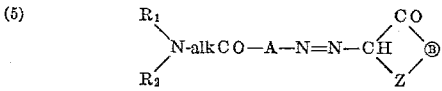

in which $R_1$, $R_2$, alk, A, B and Z have the meanings given above, is treated with an alkylating agent.

The aminobenzene derivatives of Formula 2 which can be used as starting materials for the process a of the present invention advantageously contain the amino group in para-position to the —CO— group. The benzene nucleus A can contain halogen atoms, nitro groups and lower alkyl or alkoxy groups as possible substituents. The following compounds may be mentioned by way of example:

4-amino-α-(N-chloro-trimethylamino)-acetophenone,
4-amino-α-(N-chloro-triethylamino)-acetophenone,
4-amino-α-(N-chloro-pyridino)-acetophenone,
4-amino-3-methyl-α-(N-chloro-trimethylamino)-acetophenone,
4-amino-3-methoxy-α-(N-chloro-trimethylamino)-acetophenone,
4-amino-3-chloro-α-(N-chloro-trimethylamino)-acetophenone,
4-amino-3-bromo-α-(N-chloro-trimethylamino)-acetophenone,
4-amino-2-chloro-α-(N-chloro-trimethylamino)-acetophenone,
4-amino-2:5-dimethyl-α-(N-chloro-trimethylamino)-acetophenone,
4-amino-β-(N-chloro-trimethylamino)-propiophenone,
4-amino-β-(N-chloro-pyridino)-propiophenone,
3-amino-α-(N-chloro-trimethylamino)-acetophenone,
3-amino-4-methyl-α-(N-chloro-trimethylamino)-acetophenone,
4-amino-α-(N-bromo-diethyl-benzoylamino)-acetophenone and
4-amino-3-nitro-α-(N-chloro-trimethylamino)-acetophenone.

These diazo components can be obtained by known methods, for example, by reacting acetylaminobenzene with chloracetyl- or chloropropionyl-chloride and reacting the chloracylaminobenzene derivatives so obtained with a tertiary amine and splitting off the acetyl group.

The diazotization of the aforesaid diazo components can be carried out by known methods, for example, with the aid of a mineral acid, especially hydrochloric acid, and sodium nitrite.

The coupling can likewise be carried out in known manner, for example, in a neutral to alkaline medium, if desired, in the presence of sodium acetate or a similar buffer or catalyst that influences the rate of coupling, for example, pyridine, or the salts thereof.

Coupling components which may be advantageously used are those compounds of the Formula 3 in which B represents a benzene or naphthalene radical in which the —CO— group and Z are in ortho-position to each other. If B is a naphthalene radical, the —CO— group and Z can also be in peri-position to each other. Of special interest as coupling components are indandiones of the formula (6) 

in which the benzene radical B can contain further substituents that do not impart solubility in water, for example, halogen atoms or alkyl, alkoxy, nitro or carbalkoxy groups.

As examples of suitable coupling components may be mentioned:

1:3-indandione,
Monochloro-1:3-indandione,
Monochloro-1:3-indandione,
Monobromo-1:3-indandione,
Mononitro-1:3-indandione,
5:6-dichloro-1:3-indandione,
5:6-dibromo-1:3-indandione,
2-carbethoxy-1:3-indandione,
5:6-dichloro-2-carbethoxy-1:3-indandione,
1:8-perinaphthindandione-(1:3),
Indoxyl,
5-chloro-indoxyl,
5-bromo-indoxyl,
2:5-dichloro-indoxyl, 2:5-dibromo-indoxyl, and
Thioindoxyldioxide of the formula

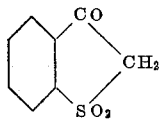

In method (b) of the present process, dyestuffs of the general Formula 4 that contain halogen-acyl groups are reacted with secondary or tertiary amines, for example, dimethylamine, trimethylamine, triethylamine, hydroxyethyldimethylamine, triethanolamine, dimethylcyclohexylamine or pyridine, advantageously by heating in an excess of the amine in the presence or absence of a solvent. The dyestuffs of the Formula 4 are advantageously obtained by coupling the diazo compound of an amino-halogen-acylbenzene, for example, 4-amino-1-chloroacetylbenzene or 4-amino-1-$\beta$-chloropropionylbenzene with one of the aforesaid coupling components.

As starting materials for method (c) of the present process dyestuffs of the Formula 5 are used, in which $R_1$ and $R_2$ are advantageously alkyl radicals. These are treated with alkylating agents, advantageously with alkyl or aralkyl halides or with the alkyl or aralkyl esters of sulfuric acid or with organic sulfonic acids. As examples of alkylating agents the following may be mentioned: methylchloride, methylbromide or methyliodide, benzylchloride, trimethyloxonium-borofluoride, dimethylsulfate, diethylsulfate, benzene-sulfonic acid methyl ester, paratoluene sulfonic acid ethyl ester or para-toluene sulfonic acid butyl ester. The alkylation is advantageously carried out by heating in an inert organic solvent, for example, in a hydrocarbon such as benzene, toluene or xylene, a halogenated hydrocarbon such as carbon tetrachloride, tetrachlorethane, chlorobenzene, ortho-dichlorobenzene or a nitro-hydrocarbon such as nitromethane, nitrobenzene or nitronaphthalene.

The purification of the dyestuff salts is advantageously carried out by dissolving them in water, it being possible to filter off any unchanged starting dyestuff as an insoluble radical. The dyestuff can be precipitated from the aqueous solution by the addition of a water-soluble salt, for example, sodium chloride.

The dyestuffs obtained by the process of the invention advantageously contain as anion the radical of a strong acid, for example, sulfuric acid or semi-esters thereof or of an aryl sulfonic acid or a halogen ion. The aforesaid anions that are introduced into the dyestuff molecule in the process of the invention can be replaced by anions of other inorganic acids, for example, by anions of phosphoric acid, sulfuric acid or organic acids, for example, formic acid, acetic acid, chloracetic acid, oxalic acid, lactic acid or tartaric acid; in some cases the free bases can also be used. The dyestuff salts can also be used in the form of double salts, for example, with halides of the elements of the second group of the Periodic System, especially zinc chloride or cadmium chloride.

The dyestuffs obtained by the process of the invention are suitable for dyeing and printing a very wide variety of materials, for example, tannined cellulosic fibers, silk, hairs, leather or synthetic fibers, especially those made of or containing polyacrylonitrile or polyvinylidine cyanide (Darvan). The yellow dyeings obtained on these fibers are distinguished by a high degree of purity of tint and by an excellent fastness to light. The dyestuffs also reserve well on wool, which makes them specially suitable for dyeing union fabrics that contain polyacrylonitrile. The good fastness of the dyeings obtained to carbonizing is worthy of special mention. Compared with similar dyestuffs described in United States Patent No. 2,965,631 and French specification No. 1,271,416, the dyestuffs of the invention give better reservation on wool.

Unless otherwise stated, the parts and percentages in the following examples are by weight:

*Example 1*

22.85 parts of 4-amino-$\alpha$-(N-chloro-trimethylamino)-acetophenone were diazotized at 0 to 5° C. in 100 parts of water with 25 parts of 30% hydrochloric acid and 6.9 parts of sodium nitrite. The diazo solution was run into a weakly alkaline solution of 14.6 parts of $\alpha$:$\gamma$-diketo-hydrindene in 200 parts of water and 8 parts of 30% sodium hydroxide solution at 0 to 5° C. At the same time, 25 parts of sodium carbonate in a 10% aqueous solution were added so that the coupling mixture remained slightly alkaline.

After coupling, the dyestuff was completely precipitated by the addition of 20 parts of sodium chloride and isolated. For purification, the dyestuff was dissolved in 500 parts of hot water, filtered with active carbon and the pure dyestuff precipitated with 20 parts of sodium chloride.

The new dyestuff of the formula

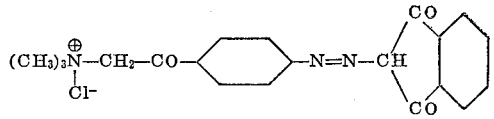

was a yellow powder that dissolved in water to give an intense yellow solution and dyed fibers and fabrics made of polyacrylonitrile greenish yellow tints possessing very good properties of fastness.

By using, instead of 4-amino-$\alpha$-(N-chloro-trimethylamino)-acetophenone, 4-amino-$\alpha$-(N-bromo-trimethylamino)-acetophenone, 4-amino-$\alpha$-(N-sulphato-trimethylamino)-acetophenone or 4-amino-$\beta$-(N-chloro-trimethylamino)-propiophenone dyestuffs possessing the same good properties were obtained.

*Example 2*

16.95 parts of 4-amino-$\alpha$-chloracetophenone were diazotized and coupled with 14.6 parts of 1:3-indandione at 0 to 5° C. in a solution made alkaline with sodium carbonate. After the monoazo dyestuff had completely precipitated, it was isolated and stirred into 600 parts of a 20% trimethylamine solution at 20 to 25° C. After a homogeneous paste had formed, it was heated to 80 to 85° C. in the course of 3 hours and then stirred for 1 hour at that temperature.

The reaction mixture was then introduced into 2000 parts of water, rendered slightly acid with hydrochloric acid, and heated to the boil. Active carbon was added to the slightly turbid solution which was then filtered. The pure dyestuff was precipitated from the clear filtrate by the addition of sodium chloride, isolated and dried. It was the same as the dyestuff obtained by the process described in Example 1.

Dyestuffs possessing the same good properties of fastness were obtained by carrying out the reaction with triethylamine, hydroxyethyl-dimethylamine or pyridine instead of with trimethylamine.

*Example 3*

33.5 parts of the dyestuff of the formula

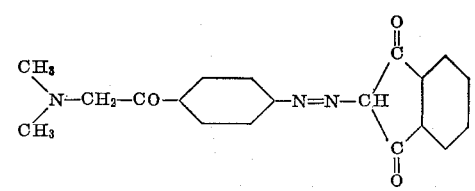

were stirred into 500 parts of chlorobenzene. A mixture of 14 parts of dimethylsulphate and 25 parts of chlorobenzene was then added dropwise at 110 to 115° C. in the course of 30 minutes and the mixture stirred for 2 hours longer at 110 to 115° C.

After cooling, the precipitated dyestuff was isolated by suction filtration and dissolved in boiling water. The dyestuff solution was purified by filtration with active carbon and the dyestuff precipitated from the filtrate by the addition of sodium chloride. The dried dyestuff was exactly the same as the dyestuff obtained by the process described in Example 1.

*Example 4*

24 parts of 3-amino-4-methyl-α-(N-chloro-trimethylamino)-acetophenone were diazotized and coupled with 14.6 parts of 1:3-indandione in a weakly alkaline solution. After the coupling, the dyestuff was completely precipitated by the addition of sodium chloride and isolated. It was purified by dissolving in hot water, filtering the solution with active carbon and precipitating the dyestuff from the filtrate by the addition of sodium chloride. It was isolated by suction filtration and dried.

The new dyestuff of the formula

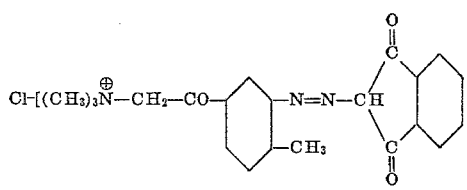

was a yellow powder that dissolved in water to give an intense yellow solution and dyed fibers and fabrics made of polyacrylonitrile greenish yellow tints possessing very good properties of fastness.

By using 4-chloro-1:3-indandione or 5:6-dichloro-1:3-indandione instead of 1:3-indandione, dyestuffs with the same good properties were obtained.

*Example 5*

27.35 parts of 3-nitro-4-amino-α-(N-chloro-trimethylamino)-acetophenone were diazotized and coupled with 14.6 parts of 1:3-indandione in a weakly alkaline solution. After coupling the dyestuff was completely precipitated by the addition of sodium chloride and isolated. The crude dyestuff was purified by dissolving in hot water and filtering with active carbon until clear. The pure dyestuff was precipitated from the filtrate by the addition of sodium chloride, filtered and dried.

The new dyestuff of the formula

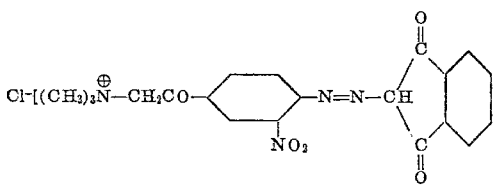

was a yellow powder that dissolved in water to give an intense yellow solution and dyed fibers and fabrics made of polyacrylonitrile yellow tints possessing very good properties of fastness.

By using 3-chloro-4-amino-α-(N-chloro-trimethylamino)-acetophenone or 3-bromo-4-amino-α-(N-chloro-trimethylamino)-acetophenone or diazo components dyestuffs with the same good properties were obtained.

*Example 6*

22.85 parts of 4-amino-α-(N-chloro-trimethylamino)-acetophenone were diazotized and coupled in a weakly alkaline solution at 0 to 5° C. with 19.6 parts of 1:β-perinaphthindandione-(1:3). The completely precipitated crude dyestuff was isolated, dissolved in boiling water, stirred with active carbon and then filtered until clear. The pure dyestuff was completely precipitated from the filtrate by adding sodium chloride, isolated by suction filtration and dried.

The new dyestuff of the formula

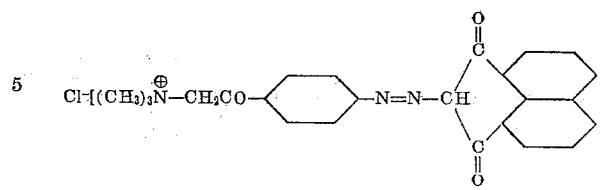

was a yellow powder that dissolved in water to give an intense yellow solution and dyed fibers and fabrics made of polyacrylonitrile yellow tints possessing very good properties of fastness.

*Example 7*

22.85 parts of 4-amino-α-(N-chloro-trimethylamino)-acetophenone were diazotized and coupled in a weakly alkaline solution with 18.2 parts of thioindoxyldioxide. The dyestuff was completely precipitated by the addition of sodium chloride and isolated. It was purified by dissolving in boiling water, stirring with active carbon, filtering and precipitating the dyestuff by the addition of sodium chloride. It was then isolated and dried.

The new dyestuff of the formula

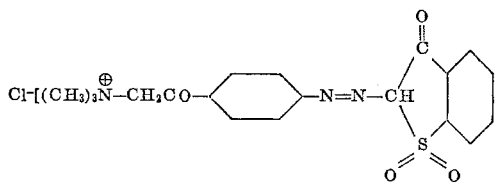

was a yellow powder that dissolved in water to give an intense yellow solution and dyed fibers and fabrics made of polyacrylnitrile yellow tints possessing very good properties of fastness.

*Example 8*

1 part of the dyestuff obtained as described in Example 1 was dissolved in 5000 parts of water in the presence of 2 parts of 40% acetic acid. 100 parts of dried yarn made from polyacrylonitrile staple fibers were entered into the dyebath so prepared at 60° C., the temperature was raised to 100° C. in the course of 30 minutes, and dyeing carried out at the boil for 1 hour. The dyeing was then well rinsed and dried. A greenish yellow dyeing was obtained possessing a very good fastness to light, sublimation and washing. A specially valuable attribute of the dyestuff was that wool treated in the same bath as the polyacrylonitrile remained completely undyed.

What is claimed is:

1. A water soluble monoazo-dyestuff of the formula

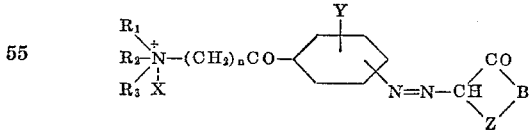

in which $R_1$, $R_2$ and $R_3$ represent lower alkyl, and in which $R_1$, $R_2$ and $R_3$ may together form with the nitrogen atom a pyridine ring, B is a member selected from the group consisting of o-phenylene, chlorinated o-phenylene and perinaphthylene, Y a member selected from the group consisting of hydrogen, lower alkyl and nitro, $n$ a whole number from 1–2, X a water soluble anion and Z a member selected from the group consisting of —CO— and —SO$_2$— groups, the azo-group being at least 3 carbon atoms away from the keto-group.

2. The dyestuff of the formula

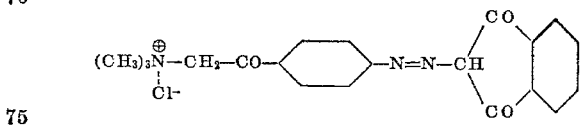

3. The dyestuff of the formula
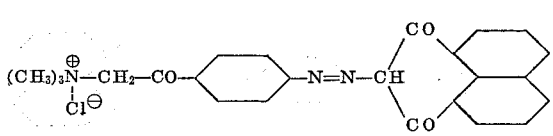
4. The dyestuff of the formula
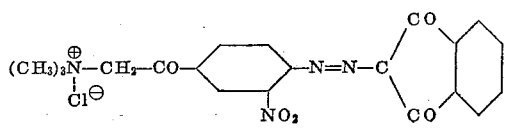
5. The dyestuff of the formula
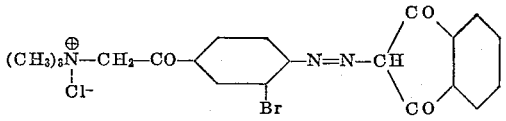
6. The dyestuff of the formula
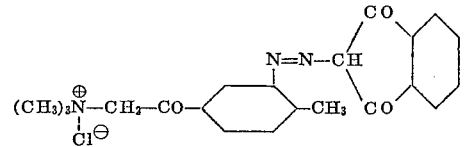
References Cited by the Examiner
UNITED STATES PATENTS
2,206,099  7/1940  McNall et al. _____ 260—193 X
CHARLES B. PARKER, Primary Examiner.